United States Patent
Lin et al.

(10) Patent No.: US 12,112,461 B2
(45) Date of Patent: Oct. 8, 2024

(54) ADAPTIVE IMAGE SHADING CORRECTION METHOD AND ADAPTIVE IMAGE SHADING CORRECTION SYSTEM

(71) Applicant: REALTEK SEMICONDUCTOR CORP., Hsinchu (TW)

(72) Inventors: Sheng-Kai Lin, Hsinchu (TW); Min-Chen Hsu, Hsinchu (TW); Pao-Chi Yeh, Hsinchu (TW); Kai-Wen Lai, Hsinchu (TW); Chen-Chieh Yao, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 372 days.

(21) Appl. No.: 17/824,064

(22) Filed: May 25, 2022

(65) Prior Publication Data
US 2023/0033975 A1    Feb. 2, 2023

(30) Foreign Application Priority Data
Jul. 28, 2021    (TW) .................... 110127618

(51) Int. Cl.
*G06T 7/13* (2017.01)
*G06T 5/20* (2006.01)
(Continued)

(52) U.S. Cl.
CPC .................. *G06T 5/92* (2024.01); *G06T 5/20* (2013.01); *G06T 5/73* (2024.01); *G06T 7/11* (2017.01);
(Continued)

(58) Field of Classification Search
None
See application file for complete search history.

(56) References Cited

U.S. PATENT DOCUMENTS

| 8,228,406 B2 | 7/2012 | Kuo et al. |
| 9,186,909 B1 | 11/2015 | Paliy |

(Continued)

FOREIGN PATENT DOCUMENTS

| CN | 104424626 B | 7/2017 |
| CN | 111757029 A | 10/2020 |
| CN | 113012051 A | 6/2021 |

OTHER PUBLICATIONS

Varuna De Silva, Viacheslav Chesnokov, Daniel Larkin; Apical Ltd; "A Novel Adaptive Shading Correction Algorithm for Camera Systems"; IS&T International Symposium on Electronic Imaging 2016 Digital Photography and Mobile Imaging XII; 2016; pp. 249.1-249.5; Loughborough, United Kingdom.

*Primary Examiner* — Tsung Yin Tsai
(74) *Attorney, Agent, or Firm* — Li & Cai Intellectual Property (USA) Office (57) ABSTRACT

An adaptive image shading correction method and an adaptive image shading system are provided. The method includes: configuring an image capturing device to obtain a current frame; and configuring a processing unit to: divide the current frame into blocks; select block pairs from the blocks, in which each of the block pairs includes an inner block and an outer block; perform a filtering process for each of the block pairs to determine whether a brightness condition, a saturation condition, a hue similarity condition, and a sharpness similarity condition are met; in response to obtaining filtered block pairs, calculate a sum similarity threshold based on hue statistical data, a saturation difference, and a brightness difference; and use filtered blocks with individual thresholds less than the sum similarity threshold to calculate a shadow compensation value to adjust the current frame.

20 Claims, 3 Drawing Sheets

(51) Int. Cl.
*G06T 5/73* (2024.01)
*G06T 5/92* (2024.01)
*G06T 7/11* (2017.01)

(52) U.S. Cl.
CPC ...... *G06T 7/13* (2017.01); *G06T 2207/20021* (2013.01)

(56) References Cited

U.S. PATENT DOCUMENTS

| | | |
|---|---|---|
| 9,270,959 B2 | 2/2016 | Shu et al. |
| 9,443,322 B2 | 9/2016 | Wang et al. |
| 11,050,988 B2 | 6/2021 | Wang et al. |
| 2015/0324988 A1* | 11/2015 | Swanson ................... G06T 5/92 |
| | | 382/103 |
| 2017/0069067 A1* | 3/2017 | Su ........................... G09G 5/10 |
| 2017/0084042 A1* | 3/2017 | Nakamae .................. G06T 7/50 |
| 2017/0195596 A1* | 7/2017 | Vogelsang .............. G06T 7/248 |
| 2020/0074944 A1* | 3/2020 | Kang ....................... G09G 3/20 |

* cited by examiner

ADAPTIVE IMAGE SHADING CORRECTION METHOD AND ADAPTIVE IMAGE SHADING CORRECTION SYSTEM

CROSS-REFERENCE TO RELATED PATENT APPLICATION

This application claims the benefit of priority to Taiwan Patent Application No. 110127618, filed on Jul. 28, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a correction method and a correction system, and more particularly to an adaptive image shading correction method and an adaptive image shading correction system.

BACKGROUND OF THE DISCLOSURE

Lens shading is an inevitable physical phenomenon occurring in an imaging module, which can be formed by two main causes as given below.

A first one of the causes is luminance shading. Since a lens that is regarded as a convex lens concentrates most of the light in a central area, there may be insufficient light at corners of the lens. Natural light attenuation caused by an angle of incidence (approximated by $\cos^4\theta$) also leads to luminance shading.

A second one of the causes is called color shading. In the lens module, there is an IR-cut filter between the lens and an image sensor to prevent an invisible infrared (IR) light from interfering with the image sensor. IR-cut filters are mainly divided into an absorption type and a reflective type.

In detail, while an advantage of the reflective type infrared filter is that a cut-off region thereof is steeper and can cut off more infrared light, such filters are severely restricted by a requirement for the angle of the incident light, which is also one of the main causes of color shading. On the other hand, an advantage of the absorption type infrared filter is that a cut-off wavelength thereof does not shift due to a variation of the incident light angle, thus providing stability. However, one of the shortcomings of the latter type is the cost that is involved.

In view of the differences between different lenses and different sensors, the same image shading compensation setting cannot achieve the same performance for every module. Furthermore, a "metamerism" phenomenon commonly occurs during shadow compensation, so that the image shading compensations that need to be matched under similar color temperatures are actually different. However, misjudgments often occur when conventional image shading compensation methods are performed.

SUMMARY OF THE DISCLOSURE

In response to the above-referenced technical inadequacies, the present disclosure provides an adaptive image shading correction method and an adaptive image shading correction system.

In one aspect, the present disclosure provides an adaptive image shading correction method, including: configuring an image capturing device to obtain a current frame; configuring an image processing circuit to receive the current frame, and configuring a processing unit to perform the following steps: dividing the current frame into a plurality of blocks; selecting a plurality of block pairs from the plurality of blocks, in which each of the block pairs includes an inner block and an outer block, the inner block is one of the plurality of blocks in an inner area of the current frame, and the outer block is one of the plurality of blocks in an outer area of the current frame; performing a filtering process for each of the plurality of block pairs, and the filtering process including the following steps: obtaining a brightness difference and a saturation difference of a current block pair; determining whether the brightness difference and the saturation difference meet a brightness condition and a saturation condition, respectively; in response to determining that the brightness difference and the saturation difference meet the brightness condition and the saturation condition, respectively, further obtaining a hue statistical data of the current block pair; determining whether the hue statistical data meets a hue similarity condition; in response to determining that the hue statistical data meets the hue similarity condition, comparing sharpnesses of the current block pair to determine whether a sharpness similarity condition is met; and in response to determining that the sharpness similarity condition is met, regarding the current block pair as a filtered block pair. The method further includes configuring the processing circuit to perform: in response to obtaining multiple ones of the filtered block pairs, calculating a sum similarity threshold according to the hue statistic data, the saturation difference, and the brightness difference of each of the multiple ones of the filtered block pairs; for each filtered block of the filtered block pairs, determining whether there is an individual threshold that is less than the sum similarity threshold; using the filtered blocks having the individual threshold value smaller than the sum similarity threshold value to calculate a shading compensation value; and adjusting the current frame with the shading compensation value to generate a compensated frame.

In another aspect, the present disclosure provides an adaptive image shading correction system, which includes an image capturing device and an image processing circuit. The image capturing device is configured to obtain a current frame. The image processing circuit is configured to receive the current frame and includes a processing circuit. The processing unit is configured to perform the following steps: dividing the current frame into a plurality of blocks; selecting a plurality of block pairs from the plurality of blocks, in which each of the block pairs includes an inner block and an outer block, the inner block is one of the plurality of blocks in an inner area of the current frame, and the outer block is one of the plurality of blocks in an outer area of the current frame; performing a filtering process for each of the plurality of block pairs, and the filtering process including the following steps: obtaining a brightness difference and a saturation difference of a current block pair; determining whether the brightness difference and the saturation difference meet a brightness condition and a saturation condition, respectively; in response to determining that the brightness difference and the saturation difference meet the brightness condition and the saturation condition, respectively, further obtaining a hue statistical data of the current block pair; determining whether the hue statistical data meets a hue similarity condition; in response to determining that the hue statistical data meets the hue similarity condition, comparing sharpnesses of the current block pair to determine whether a sharpness similarity condition is met; and in response to determining that the sharpness similarity condition is met, regarding the current block pair as a filtered block pair. The processing circuit is further configured to perform the following steps: in response to obtaining multiple ones of the filtered block pairs, calculating a sum similarity threshold according to the hue statistic data, the saturation difference, and the brightness difference of each of the multiple ones of the filtered block pairs; for each filtered block of the filtered block pairs, determining whether there is an individual threshold that is less than the sum similarity threshold; using the filtered blocks having the individual threshold value smaller than the sum similarity threshold value to calculate a shading compensation value; and adjusting the current frame with the shading compensation value to generate a compensated frame.

Therefore, the adaptive image shadow correction method and the adaptive image shadow correction system provided by the present disclosure can achieve a better balance between different modules, while avoiding shading compensation errors caused by "metamerism". Without consuming additional computations and hardware support, shadow compensation can be achieved by the existing statistics of automatic white balance and automatic exposure.

In addition, the adaptive image shadow correction method and the adaptive image shadow correction provided by the present disclosure can obtain the most suitable match result for shadow compensation by filtering selected block pairs and calculating similarities. In addition, for all of the block pairs that have been filtered, moving averages are individually implemented to eliminate deviation extreme values, which can prevent a single block pair from causing an excessive offset, while ensuring the stability of the adaptive image shadow correction method and the adaptive image shadow correction system of the present disclosure.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1:
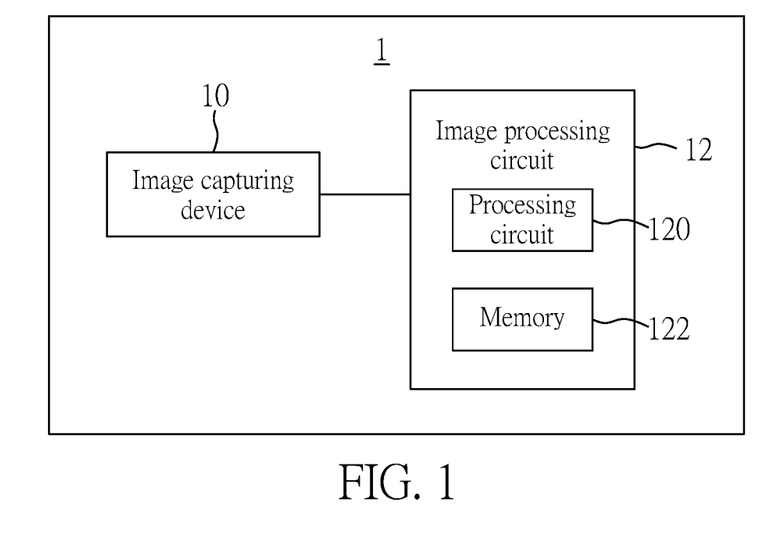
FIG. 1 is a functional block diagram of an image shading correction system according to one embodiment of the present disclosure.

Referring to FIG. 1, a first embodiment of the present disclosure provides an adaptive image shading correction system 1, which includes an image capturing device 10 and an image processing circuit 12. The image capturing device 10 can be, for example, a camera or a video camera, and is configured to obtain a current frame FM. The image shading correction system 1 can be a handheld device or a similar device (such as a desktop computer or a laptop computer with similar imaging capabilities). It should be noted that the image processing circuit 12, a processing unit 120, a memory 122, and/or other processing circuits are generally referred to as an "image processing circuit" herein. The image processing circuit can be embodied in whole or in part as software, firmware, hardware or any combination thereof. In addition, the image processing circuit can be a single processing module contained therein, or can be fully or partially incorporated into any of the other components in the image shading correction system 1. Alternatively, the image processing circuit 12 can be partially embodied in the image shading correction system 1.

In the image processing circuit 12 of FIG. 1, the processing unit 120 and/or other data processing circuits are operatively coupled a memory 122 to execute various algorithms for executing the technology disclosed in the present disclosure. These algorithms can be executed by the processing unit 120 and/or other processing circuits, associated firmware or software based on certain instructions that can be executed by the processing unit 120 and/or other processing circuits. Any suitable product (including one or more tangible computer readable media) can be used to store these instructions collectively. The product(s) can include, for example, a memory 122. The memory 122 can include any suitable product for storing data and executable commands, such as a random-access memory, a read-only memory, a rewritable flash memory, a hard disk drive, and an optical disc.

Figure 2:
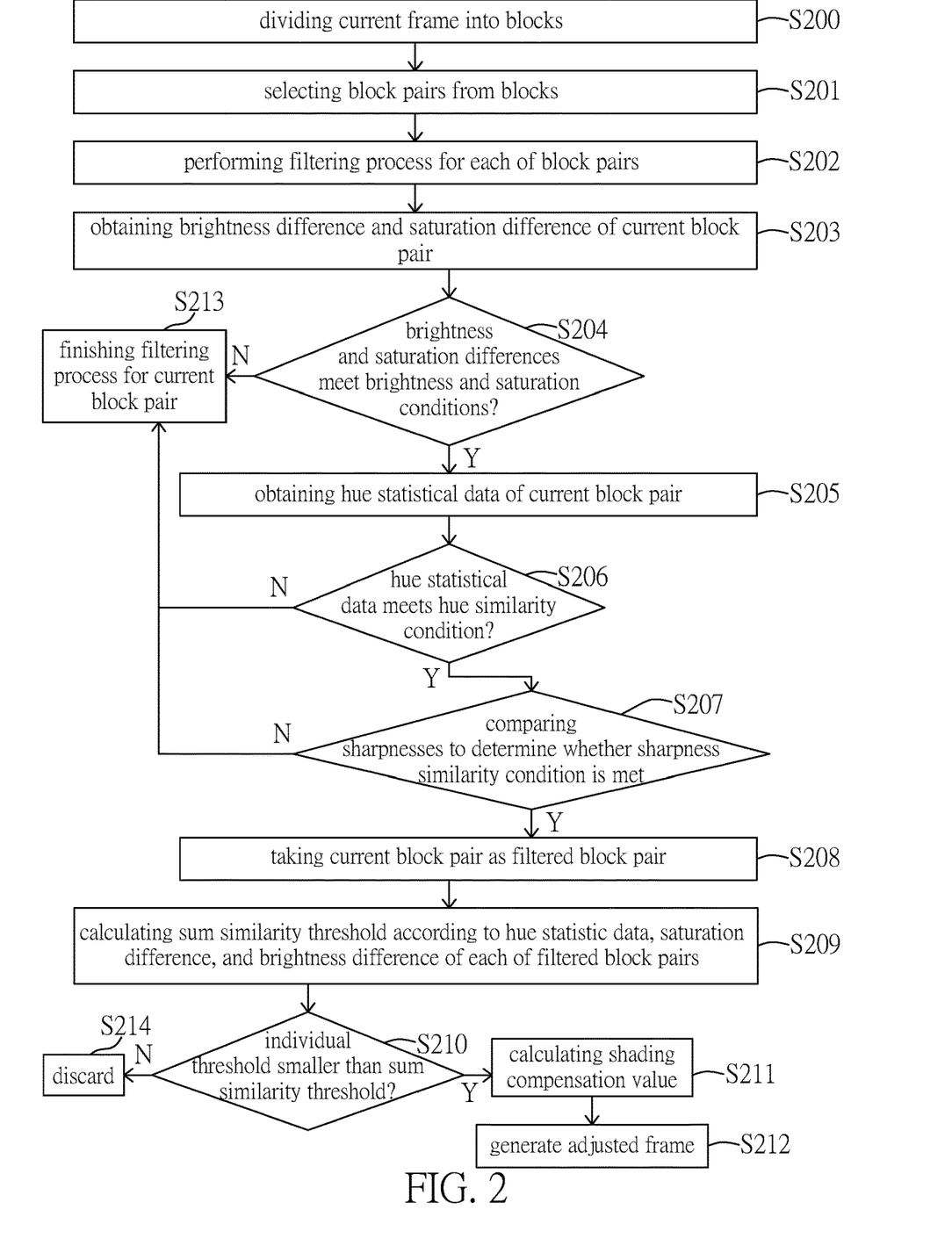
FIG. 2 is a flowchart of an image shading correction method according to one embodiment of the present disclosure.
Figure 3:
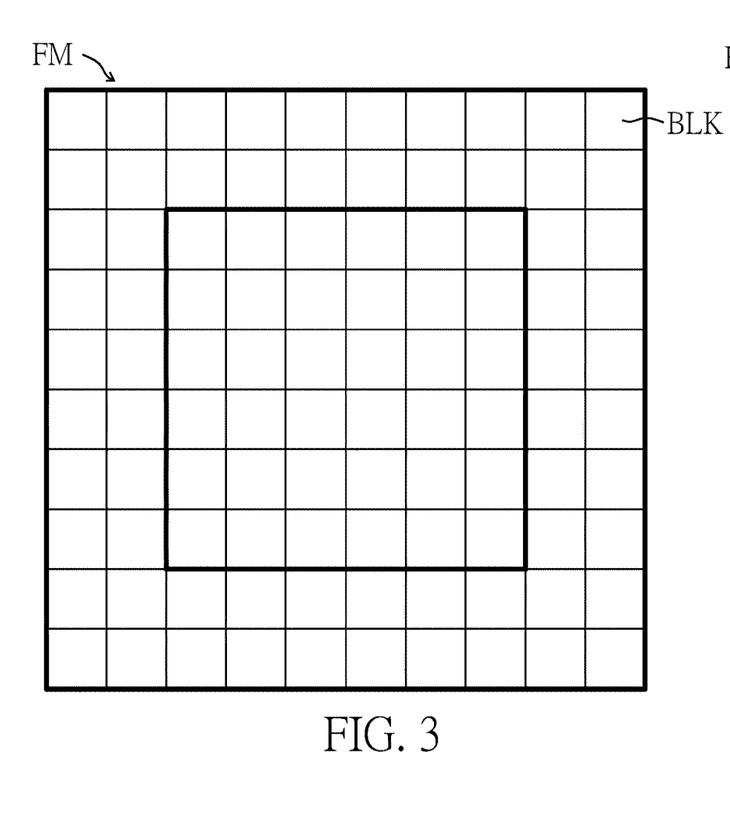
FIG. 3 is a schematic diagram of a current screen divided into multiple blocks according to an embodiment of the present disclosure.
Figure 4:
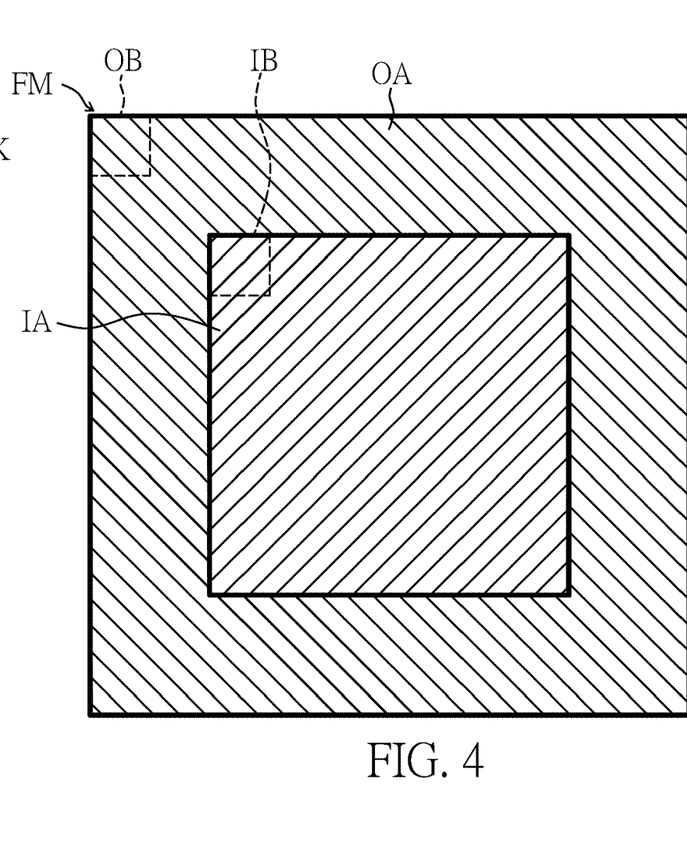
FIG. 4 is a schematic diagram of selecting an inner block and an outer block from the current frame as a block pair according to an embodiment of the present disclosure.

Further reference can be made to FIG. 2, FIG. 3, and FIG. 4. FIG. 2 is a flowchart of an image shading correction method according to one embodiment of the present disclosure, FIG. 3 is a schematic diagram of a current screen divided into multiple blocks according to an embodiment of the present disclosure, and FIG. 4 is a schematic diagram of selecting an inner block and an outer block from the current frame as a block pair according to an embodiment of the present disclosure.

As shown in FIG. 2, the image shading correction method can include the following steps:

Step S200: dividing the current frame FM into a plurality of blocks BLK. For example, FIG. 3 shows that the current frame FM is divided into the plurality of blocks BLK of 10 by 10, and the blocks BLK have the same size, but the present disclosure is not limited thereto, and the size and quantity configuration can be changed according to requirements.

Step S201: selecting a plurality of block pairs from the plurality of blocks BLK.

In detail, each block pair includes an inner block IB and an outer block OB. The inner block IB is one of the blocks BLK in an inner area IA of the current frame FM, and the outer block OB is one of the blocks BLK in an outer area OA of the current frame FM. The number of block pairs can reach the total number of blocks BLK at most, and the selection manner can be repetitive or non-repetitive.

In order to accurately restore an image error caused by lens shading of the image capturing device 10, block pairs with a reference value must be selected first. Therefore, the method proceeds to step S202: performing a filtering process for each of the block pairs, including the following steps:

Step S203: obtaining a brightness difference and a saturation difference of a current block pair.

In detail, since misjudgments can easily be made if only the brightness difference of the block pair is considered, it is necessary to further consider the saturation difference together with the brightness difference. In some embodiments, average brightnesses of multiple pixels in the inner block IB and average brightnesses of multiple pixels in the outer block OB can be calculated first, and then a difference between the two can be used as the brightness differences. In this way, calculations at the pixel level can be avoided, so as to save system computations.

Furthermore, in this step, the average brightness of the inner block IB or the outer block OB is calculated by excluding the pixels whose pixel brightness higher than a brightness threshold from the pixels corresponding to the inner block or the outer block. In other words, after overexposed pixels are eliminated by setting the brightness threshold, an effective pixel brightness in the block can be calculated.

On the other hand, the saturation difference of the block pair is a difference between a saturation of the inner block IB and a saturation of the outer block OB.

The saturation of the inner block IB or the outer block OB can be expressed by the following equation (1):

$$S = \begin{cases} 0°, & C_{max} = 0 \\ \dfrac{\Delta}{C_{max}}, & C_{max} \neq 0 \end{cases}; \quad \text{equation (1)}$$

where $\Delta = C_{max} - C_{min}$, S is saturation, $C_{max}$ is a maximum value of RGB, and $C_{min}$ is a minimum value of RGB, which can be represented by the following equations (2) and (3) respectively:

$$C_{max} = \max(R', G', B') \quad \text{equation (2);}$$

$$C_{min} = \min(R', G', B') \quad \text{equation (3);}$$

where $$R' = \frac{R}{255}, G' = \frac{G}{255}, \text{ and } B' = \frac{B}{255};$$

and R is a red coordinate value, G is a green coordinate value, and B is a blue coordinate value.

Step S204: determining whether the brightness difference and the saturation difference meet a brightness condition and a saturation condition, respectively. The brightness condition and the saturation condition can be, for example: in a case where the saturation of the inner block and the saturation of the outer block are both low, the inner block and the outer block are taken as being close to gray. Based on a determination of shading compensation, even if the brightness difference between the inner block and the outer block is relatively large, the block pair should be taken as having high similarity and can be used to determine shading compensation.

In response to determining that the brightness difference does not meet the brightness condition, or the saturation difference does not meet the saturation condition, the method proceeds to step S213: finishing the filtering process for the current block pair, and successively determining the remaining unfiltered block pairs.

In response to determining that the brightness difference and the saturation difference meet the brightness condition and the saturation condition, respectively, the method proceeds to step S205: obtaining hue statistical data of the current block pair.

In detail, the hue statistical data can include a red gain and a green gain, which can be used as a condition for determining whether a block pair has similar hues.

The red gain (R Gain) is a ratio of an average value of red coordinate values of all pixels to an average value of green coordinate values of all pixels in the outer block or the inner block, that is, the R gain is referred to as a ratio of a block average red coordinate value to a block average green coordinate value (R/G). It should be noted that the R Gain of the inner block is marked as R/G, and the R Gain of the outer block is marked as R'/G'.

The blue gain (B Gain) is a ratio of an average value of blue coordinate values of all pixels to an average value of green coordinate values of all pixels in the outer block or the inner block, that is, the B gain is referred to as a ratio of a block average blue coordinate value to a block average green coordinate value (B/G). It should be noted that the B Gain of the inner block is marked as B/G, and the B Gain of the outer block is marked as B'/G'.

In addition, although the R gain and the B gain can be used as conditions for determining whether a block pair has similar hues, since the green coordinate values of the block pair is a key factor, the hue statistic data also includes a ratio of a block average green coordinate value of the inner block to a block average green coordinate value of the outer block of the current block pair, and this ratio is used as a green channel ratio for determination and avoiding hue channel errors caused by the green coordinate value.

Step S206: determining whether the hue statistical data meets a hue similarity condition.

In this step, the hue similarity condition can be, for example, determining whether an inequality of the following equation (4) is satisfied:

0.9<Hue Diff'/Hue Diff<1.1   equation (4);

where Hue Diff represents a difference between R/G and B/G in the inner block, and Hue Diff' represents a difference between R'/G' and B'/G' in the outer block. In a conversion from RGB coordinates to HSV coordinates, X axis is R/G, Y axis is B/G, and values of R/G and B/G can be used as a reference value for hue on HSV coordinates, and can be used to replace H values of HSV.

Therefore, the step of determining whether the hue statistical data meets the hue similarity condition can include firstly determining whether the green channel ratio is within a predetermined hue range, and then comparing the red gain and the blue gain of the inner block with the red gain and the blue gain of the outer block.

In response to determining that the hue statistical data meets the hue similarity condition, the method proceeds to step S207: comparing sharpnesses of the current block pair to determine whether a sharpness similarity condition is met.

In detail, the sharpnesses of a block pair are calculated for determining a complexity of the frame, and in a case that the frame is complicated, an average value of gray scale of the frame has a reference value for performing the shading compensation. Therefore, the present disclosure can utilize sharpness statistics (AF) to provide corresponding threshold values used as weights to select blocks for scenes of different complexity.

In detail, a ratio of the sharpness of the inner block and the sharpness of the outer block can be used as a parameter for setting the weight, and the ratio is calculated by dividing the small value with the large value. For example, if the ratio of the sharpness of the inner block and the sharpness of the outer block is within a range of 0.9 to 1, then the weight is set to 1. If the ratio of the sharpnesses falls within a range of 0.75 to 0.9, an average for this interval is used as the weight, that is, the weight can be (0.75+0.9)/2, which is 0.825, and the weight of all block pairs can be calculated in this manner.

The step of comparing the sharpnesses of the current block pair further includes executing an edge detection Sobel filter on the outer block OB and the inner block IB to generate an inner block sharpness and an outer block sharpness, and comparing the inner block sharpness with the outer block sharpness.

The sharpness can be expressed by the following equation (5):

$$\text{Sharpness} = \sqrt[2]{G_x^2 + G_y^2}$$   equation (5);

The edge detection Sobel filter can be expressed by the following equations (6) and (7):

$$G_X = \begin{bmatrix} -1 & -2 & -1 \\ 0 & 0 & 0 \\ 1 & 2 & 1 \end{bmatrix} * \text{Image};$$   equation (6)

$$G_Y = \begin{bmatrix} -1 & 0 & 1 \\ -2 & 0 & 2 \\ -1 & 0 & 1 \end{bmatrix} * \text{Image};$$   equation (7)

where Image can be images corresponding to the outer block OB and the inner block IB, respectively.

Further, the inner block sharpness can be compared with the outer block sharpness to determine whether the sharpness similarity condition is met. For example, a difference between the inner block sharpness and the outer block sharpness can be calculated, and whether the difference is within a sharpness range or not can be determined. Alternatively, the ratio of the inner block sharpness and the outer block sharpness can be calculated, and whether the ratio is within a ratio set by the sharpness range can be determined, for example, the sharpness range can be set between 0.95 and 1.05.

For example, in response to the ratio of the inner block sharpness and the outer block sharpness being 1, the inner block sharpness is taken as being equal to the outer block sharpness and is within the sharpness range, so that the sharpness similarity condition is met. For different intervals in the sharpness range, different confidence weights can be given. For example, in a range of 1 to 1.03, 100% confidence is given, the confidence weight is 1, and in a range of 1.03 to 1.05, 80% confidence is given, the confidence weight is 0.8, and so forth.

In response to determining that the sharpness similarity condition is met, the method proceeds to step S208: taking the current block pair as a filtered block pair, which represents that the current block pair passes the filtering process.

After obtaining multiple filtered block pairs, the red gains and the green gains can be counted separately, and a moving average filtering can be performed to eliminate deviation extreme values. In this way, an excessive offset caused by a single block pair can be avoided, while ensuring stability of the algorithm of the present disclosure.

Next, in response to obtaining multiple ones of the filtered block pairs, the method proceeds to step S209: calculating a sum similarity threshold according to the hue statistic data, the saturation difference, and the brightness difference of each of the multiple ones of the filtered block pairs.

In detail, a sum similarity threshold can be set by calculating an Euclidean norm of the filtered block pairs, which can be expressed by the following equation (8):

$$\text{Threshold} = \sqrt{\text{RBGain\_Diff}^2 + \text{Saturation\_Diff}^2 + \text{Brightness\_Diff}^2}$$   equation (8);

where RBGain_Diff is a difference in hue (HUE) between the inner block and the outer block in one of the filtered block pair, and Saturation_Diff is a saturation difference between the inner block and the outer block in one of the filtered block pair, Brightness_Diff is the brightness difference between the inner block and the outer block in one of the filtered block pair.

For each filtered block of the filtered block pairs, the method proceeds to step S210: determining whether there is an individual threshold smaller than the sum similarity threshold.

In addition, in step S210, it can be further determined whether a weight of the block pair is greater than a predetermined weight value (i.e., the weight determined according to the ratio of inner and outer sharpness as described above). In some embodiments, if the weight is less than 0.5, the block pair is discarded.

In response to the individual threshold value being less than the sum similarity threshold value, the method proceeds to step S211: using the filtered blocks having the individual threshold value smaller than the sum similarity threshold value to calculate a shading compensation value.

In more detail, the calculation of the shadow compensation value is mainly used to calculate a ratio of R/G of the inner block and R'/G' of the outer block in one of the filtered block pairs. If the red gain (R Gain) of the outer block is larger, the outer block is determined to require more R value.

For example, if a value of R'/G' divided by R/G (that is, the ratio of the R Gain of the inner block to the R Gain of the outer block) is greater than 1, the red coordinate value R of the outer block is taken as being insufficient, and thus the shading compensation of R channel will be increased until the ratio R'/G'/R/G is between 0.99 and 1.01.

It should be noted that the block pairs that are finally obtained for reference should ideally be maintained at a sufficient number. However, in practical applications, the obtained block pairs may occasionally be too few in number.

Therefore, in order to prevent the number of obtained block pairs from being too few and causing compensation errors, another threshold (percentage) can be used to determine the weight, and a buffer can be set up to try to perform the shading compensation. When no more block pairs are found after a certain number of times for that the filtering process has performed, the shadow compensation is then stopped, and the obtained block pairs are used as a final result.

In a final calculated shading ratio, the following definitions are used for the R channel and the B channel:

R channel: (inner red gain/outer red gain−1)*corresponding weight;

B Channel: (inner blue gain/outer blue gain−1)*corresponding weight.

The corresponding weights in the above two equations are determined by the block pairs that are finally obtained.

For example, n is the number of block pairs obtained, and N is the total number of block pairs. If n is less than or equal to N*¼, the corresponding weight is 1, otherwise the corresponding weight is 4*n/N. The above are only examples, and the present disclosure is not limited to this condition.

The method proceeds to step S212: adjusting the current frame with the shading compensation value to generate an adjusted frame.

For example, after the shading compensation value is determined, the current frame can be adjusted according to predetermined correction magnifications. For example, adjustment values of a center and edges of the frame may be different by multiplying predetermined correction magnifications. The predetermined correction magnifications can be represented by the following equation (9), for example, x represents a horizontal coordinate of the frame, and y represents the correction magnification corresponding to x coordinate:

$$y = ax^2 + bx + c = a\left(x + \frac{b}{2a}\right)^2 + c - \frac{b^2}{4a}. \quad \text{equation (9)}$$

In addition, it should be noted that, since the brightness, saturation, sharpness, and hue statistical data used in the above process can be obtained from inherent hardware statistical data of the existing image capturing device, the adaptive image shading correction method and the adaptive image shading correction system provided by the present disclosure do not need to consume additional computations and do not require special hardware support.

In conclusion, the adaptive image shadow correction method and the adaptive image shadow correction system provided by the present disclosure can achieve a better balance between different modules, while avoiding shading compensation errors caused by "metamerism". Without consuming additional computations and hardware support, shadow compensation can be achieved by the existing statistics of automatic white balance and automatic exposure.

In addition, the adaptive image shadow correction method and the adaptive image shadow correction provided by the present disclosure can obtain the most suitable match result for shadow compensation by filtering selected block pairs and calculating similarities. In addition, for all of the block pairs that have been filtered, moving averages are individually implemented to eliminate deviation extreme values, which can prevent a single block pair from causing an excessive offset, while ensuring the stability of the adaptive image shadow correction method and the adaptive image shadow correction system of the present disclosure. The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An adaptive image shading correction method, comprising:
configuring an image capturing device to obtain a current frame;
configuring an image processing circuit to receive the current frame, and configuring a processing unit to perform the following steps:
dividing the current frame into a plurality of blocks;
selecting a plurality of block pairs from the plurality of blocks, wherein each of the block pairs includes an inner block and an outer block, the inner block is one of the plurality of blocks in an inner area of the current frame, and the outer block is one of the plurality of blocks in an outer area of the current frame;
performing a filtering process for each of the plurality of block pairs, and the filtering process including the following steps:
obtaining a brightness difference and a saturation difference of a current block pair;
determining whether the brightness difference and the saturation difference meet a brightness condition and a saturation condition, respectively;
in response to determining that the brightness difference and the saturation difference meet the brightness condition and the saturation condition, respectively, further obtaining a hue statistical data of the current block pair;
determining whether the hue statistical data meets a hue similarity condition;
in response to determining that the hue statistical data meets the hue similarity condition, comparing sharpnesses of the current block pair to determine whether a sharpness similarity condition is met; and in response to determining that the sharpness similarity condition is met, taking the current block pair as a filtered block pair;

in response to obtaining multiple ones of the filtered block pairs, calculating a sum similarity threshold according to the hue statistic data, the saturation difference, and the brightness difference of each of the multiple ones of the filtered block pairs;

for each filtered block of the filtered block pairs, determining whether there is an individual threshold that is less than the sum similarity threshold;

using the filtered blocks having the individual threshold smaller than the sum similarity threshold value to calculate a shading compensation value; and adjusting the current frame with the shading compensation value to generate a compensated frame.

2. The image shading correction method according to claim 1, wherein, in the filtering process, the brightness difference of the block pair is a difference between an average brightness of a plurality of pixels in the inner block and an average brightness of a plurality of pixels in the outer block.

3. The image shading correction method according to claim 2, wherein the average brightness of the inner block or the outer block is calculated by excluding the pixels whose pixel brightness are higher than a brightness threshold from the pixels corresponding to the inner block or the outer block.

4. The image shading correction method according to claim 1, wherein, in the filtering process, the saturation difference of the block pair is a difference between a saturation of the inner block and a saturation of the outer block.

5. The image shading correction method according to claim 4, wherein the saturation is expressed by the following equation:

$$S = \left\{ \begin{array}{ll} 0°, & C_{max} = 0 \\ \frac{\Delta}{C_{max}}, & C_{max} \neq 0 \end{array} \right\};$$

wherein $\Delta = C_{max} - C_{min}$, S is the saturation, $C_{max}$ is a maximum value of RGB, and $C_{min}$ is a minimum value of RGB, which can be expressed by the following equation:

$$C_{max} = \max(R', G', B');$$

$$C_{min} = \min(R', G', B');$$

where $$R' = \frac{R}{255}, G' = \frac{G}{255}, \text{ and } B' = \frac{B}{255};$$

and R is a red coordinate value, G is a green coordinate value, and B is a blue coordinate value.

6. The image shading correction method according to claim 1, wherein the step of obtaining the hue statistical data of the current block pair includes:

calculating a red gain and a green gain of each of the inner block and the outer block of the current block pair, wherein the red gain is a ratio of a block average red coordinate value to a block average green coordinate value, and a blue gain is a ratio of a block average blue coordinate value to the block average green coordinate value; and calculating a ratio of the block average green coordinate value of the inner block to the block average green coordinate value of the outer block of the current block pair as a green channel ratio.

7. The image shading correction method according to claim 6, wherein the step of determining whether the hue statistical data meets the hue similarity condition includes:

determining whether the green channel ratio is within a predetermined hue range; and in response to the green channel ratio being within the predetermined hue range, comparing the red gain and the green gain of the inner block with the red gain and the green gain of the outer block.

8. The image shading correction method described in claim 6 further includes:

in response to obtaining multiple ones of the filtered block pairs, the red gains and the green gains are separately counted, and a moving average filtering is performed to eliminate deviation extreme values.

9. The image shading correction method according to claim 1, wherein the step of comparing the sharpnesses of the current block pair further includes executing an edge detection Sobel filter on the outer block and the inner block of the current block pair to generate an inner block sharpness and an outer block sharpness, and comparing the inner block sharpness with the outer block sharpness.

10. The image shading correction method according to claim 9, wherein the inner block sharpness and the outer block sharpness are used in conjunction with the sum similarity threshold to calculate a weight.

11. An adaptive image shading correction system, comprising:

an image capturing device configured to obtain a current frame;

an image processing circuit configured to receive the current frame and including a processing circuit, wherein the processing unit is configured to perform the following steps:

dividing the current frame into a plurality of blocks;

selecting a plurality of block pairs from the plurality of blocks, wherein each of the block pairs includes an inner block and an outer block, the inner block is one of the plurality of blocks in an inner area of the current frame, and the outer block is one of the plurality of blocks in an outer area of the current frame;

performing a filtering process for each of the plurality of block pairs, and the filtering process including the following steps:

obtaining a brightness difference and a saturation difference of a current block pair;

determining whether the brightness difference and the saturation difference meet a brightness condition and a saturation condition, respectively;

in response to determining that the brightness difference and the saturation difference meet the brightness condition and the saturation condition, respectively, further obtaining a hue statistical data of the current block pair;

determining whether the hue statistical data meets a hue similarity condition;

in response to determining that the hue statistical data meets the hue similarity condition, comparing sharpnesses of the current block pair to determine whether a sharpness similarity condition is met; and in response to determining that the sharpness similarity condition is met, taking the current block pair as a filtered block pair;

in response to obtaining multiple ones of the filtered block pairs, calculating a sum similarity threshold according to the hue statistic data, the saturation difference, and the brightness difference of each of the multiple ones of the filtered block pairs;

for each filter block of the filtered block pairs, determining whether there is an individual threshold that is less than the sum similarity threshold;

using the filtered blocks having the individual threshold value smaller than the sum similarity threshold value to calculate a shading compensation value; and adjusting the current frame with the shading compensation value to generate a compensated frame.

12. The image shading correction system according to claim 11, wherein, in the filtering process, the brightness difference of the block pair is a difference between an average brightness of a plurality of pixels in the inner block and an average brightness of a plurality of pixels in the outer block.

13. The image shading correction system according to claim 12, wherein the average brightness of the inner block or the outer block is calculated by excluding the pixels whose pixel brightness are higher than a brightness threshold from the pixels corresponding to the inner block or the outer block.

14. The image shading correction system according to claim 1, wherein, in the filtering process, the saturation difference of the block pair is a difference between a saturation of the inner block and a saturation of the outer block.

15. The image shading correction system according to claim 14, wherein the saturation is expressed by the following equation:

$$S = \left\{ \begin{array}{ll} 0°, & C_{max} = 0 \\ \dfrac{\Delta}{C_{max}}, & C_{max} \neq 0 \end{array} \right\};$$

wherein $\Delta = C_{max} - C_{min}$, S is the saturation, $C_{max}$ is a maximum value of RGB, and $C_{min}$ is a minimum value of RGB, which can be expressed by the following equation:

$C_{max} = \max(R', G', B')$;

$C_{min} = \min(R', G', B')$;

where $$R' = \frac{R}{255},\ G' = \frac{G}{255},\ \text{and}\ B' = \frac{B}{255};$$

and R is a red coordinate value, G is a green coordinate value, and B is a blue coordinate value.

16. The image shading correction system according to claim 11, wherein the step of obtaining the hue statistical data of the current block pair includes:

calculating a red gain and a green gain of each of the inner block and the outer block of the current block pair, wherein the red gain is a ratio of a block average red coordinate value to a block average green coordinate value, and a blue gain is a ratio of a block average blue coordinate value to the block average green coordinate value; and calculating a ratio of the block average green coordinate value of the inner block to the block average green coordinate value of the outer block of the current block pair as a green channel ratio.

17. The image shading correction system according to claim 16, wherein the step of determining whether the hue statistical data meets the hue similarity condition includes:

determining whether the green channel ratio is within a predetermined hue range; and in response to the green channel ratio being within the predetermined hue range, comparing the red gain and the green gain of the inner block with the red gain and the green gain of the outer block.

18. The image shading correction system according to claim 16, wherein the processing circuit is further configured to perform:

in response to obtaining multiple ones of the filtered block pairs, the red gains and the green gains are separately counted, and a moving average filtering is performed to eliminate deviation extreme values.

19. The image shading correction system according to claim 11, wherein the step of comparing the sharpnesses of the current block pair further includes executing an edge detection Sobel filter on the outer block and the inner block of the current block pair to generate an inner block sharpness and an outer block sharpness, and comparing the inner block sharpness with the outer block sharpness.

20. The image shading correction system according to claim 19, wherein the inner block sharpness and the outer block sharpness are used in conjunction with the sum similarity threshold to calculate a weight.

* * * * *